(12) United States Patent
Brewer et al.

(10) Patent No.: US 7,704,579 B2
(45) Date of Patent: Apr. 27, 2010

(54) SYSTEM FOR SEAMING HIGH-MODULUS, HIGH-TENACITY, LOW-ELONGATION FABRICS

(75) Inventors: John F. Brewer, Mogadore, OH (US);
Dhiraj H. Darjee, Copley, OH (US);
David R. Dingler, Massillon, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 1064 days.

(21) Appl. No.: 11/391,747

(22) Filed: Mar. 29, 2006

(65) Prior Publication Data
US 2007/0238381 A1 Oct. 11, 2007

(51) Int. Cl.
*B32B 3/10* (2006.01)
(52) U.S. Cl. ..................................................... 428/61
(58) Field of Classification Search .................. 428/61; 2/275
See application file for complete search history.

(56) References Cited

U.S. PATENT DOCUMENTS

| 3,545,795 | A | * | 12/1970 | Hertel et al. | 403/265 |
| 4,303,712 | A | * | 12/1981 | Woodroof | 428/58 |
| 2002/0001731 | A1 | * | 1/2002 | Kufferath | 428/608 |
| 2004/0151865 | A1 | | 8/2004 | Howland | 428/58 |
| 2004/0180161 | A1 | * | 9/2004 | Lavan et al. | 428/35.7 |

* cited by examiner

*Primary Examiner*—Alexander Thomas
(74) *Attorney, Agent, or Firm*—Renner Kenner Greive Bobak Taylor & Weber (57) ABSTRACT

A seaming system for forming a seam is disclosed, wherein the seam consists of at least two opposed sections of high-modulus, high-tenacity, low-elongation fabric sections joined by a tape. The system comprises a seamer head, and a seamer base that includes a topography configured to impart a predetermined pressure gradient to the adhesive layer, tape, and fabric sections of the seam. The resultant seam has a cross-section or thickness profile that generally corresponds to that of the applied pressure gradient. As such, the constructed seam more efficiently distributes stress imparted from any applied load.

9 Claims, 8 Drawing Sheets

SYSTEM FOR SEAMING HIGH-MODULUS, HIGH-TENACITY, LOW-ELONGATION FABRICS

GOVERNMENT LICENSE RIGHTS

The U.S. Government may have a paid-up license in this invention and the right in limited circumstances to require the patent owner to license others on reasonable terms as provided for by the terms of Contract No. HQ0006-04-9-0001 awarded by the Missile Defense Agency—Department of Defense.

TECHNICAL FIELD

Generally, the present invention relates to a system for seaming fabrics. More specifically, the present invention relates to a system for seaming high-modulus, high-tenacity, low-elongation fabrics. Particularly, the present invention is directed to a system and related methods for seaming high-modulus, high-tenacity, low-elongation fabrics such that stresses induced at the resultant seam are distributed, rather than concentrated about the region of the seam.

BACKGROUND ART

Traditional airships, which may also be referred to as blimps, aerostats, dirigibles, or lighter-than-air vehicles, have an external skin made of numerous sections of fabric. Because of the size of the airship, the external skin must be formed from several sections of fabric that are joined by various seams. In such applications, a strap joint seam has been found to have acceptable durability, and resiliency to accommodate the operating requirements of the airship. To form the strap joint, at least two sections of fabric are arranged, such that the edges of each section of fabric are abutted or positioned closely adjacent one another to create a seam interface. Next, a layer of adhesive is applied to the region about the seam interface, and a tape or strap, is attached in a laminated manner to the adhesive layer. To complete the seam, heat and/or pressure may be applied to the strap, and fabric sections to allow the adhesive to melt, or flow, thus completing the formation of the seam. Once completed, forces or stress that are applied to the fabric sections are transferred through the tape of the seam, thus allowing the individual sections of fabric to behave as if it were a single section of fabric.

In general, traditional airships have used high elongation fabrics that also have a very high elasticity, or low-modulus. To form the completed skin of the airship, the fabric must be seamed together with other pieces of fabric, as previously discussed. As such, the structural longevity of the airship is dependent on the ability of the seams to distribute, and withstand the various forces applied thereto. Because the low-modulus fabric used on traditional airships is flexible, it allows forces that are imparted to the seam to be distributed to a suitable extent, rather than allowing forces to be concentrated in various regions of the seam. By preventing stress concentrations from developing at the seam regions, the airship is able to have a much longer operational lifespan, while increasing the time between seam repairs.

High-altitude airships, however, are designed to attain an altitude significantly greater than that of traditional airships. As such, different structural and mechanical considerations must be made, including the utilization of a high-modulus, high-tenacity, low-elongation fabric as an external skin. Unlike low-modulus fabrics used on traditional airships, high-modulus fabrics are highly resistant to stretching. Furthermore, high-tenacity fabrics are designed to rupture only when subjected to high levels of tensile stress. Because the skin of the high-altitude airship is subjected to various forces, some of which may be very high, the seams of the fabric sections of the external skin are also required to withstand such forces. However, because high-modulus fabric does not stretch sufficiently when loaded, stress is not distributed about the seam. Rather, stress from an applied load causes stress concentrations to develop locally in and about the area of the seam. This concentration of stress is unwanted, as it may lead to the premature failure of the fabric, and the seam that comprise the skin of the high-altitude airship, thus reducing its useful life.

Therefore, there is a need for a seaming system to join sections of high-modulus, high-tenacity, low-elongation fabric that reduces the concentration of stress in and about the region of the completed seam, so as to allow the seam to achieve enhanced load endurance. Additionally, there is a need for a seaming system to join sections of high-modulus, high-tenacity, low-elongation fabric that distributes stress along the length of the seam. Furthermore, there is a need for a seaming system that reduces the opportunity of de-lamination between the high-modulus, high-tenacity, low-elongation fabric, and the structural tape used to form the seam.

SUMMARY OF INVENTION

In light of the foregoing, it is a first aspect of the present invention to provide a system and method for seaming high-modulus, high-tenacity, low-elongation fabrics.

It is another aspect of the present invention to provide a seam comprising at least two opposing fabric sections, each having a facing surface, an adhesive layer disposed upon each facing surface; and a tape disposed upon the adhesive layer, so as to join the at least two opposing fabric sections, wherein said seam is configured to have a non-uniform predetermined thickness profile formed from the application of at least one of heat and pressure.

Yet another aspect of the present invention is to provide a seaming system to form a seam comprising a seamer head, a seamer base spaced apart from the seamer head and forming an opening therebetween, a first backing layer disposed adjacent the seamer base, and a second backing layer disposed adjacent the first backing layer wherein the seamer head and the seamer base are movable relative to each other so as to apply pressure to a seam placed in the opening.

Still another aspect of the present invention is to provide a method of forming a seam comprising providing an opposed seamer head and seamer base with an opening therebetween, the seamer base having a topography, disposing a programmer upon one of the seamer base and the seamer head, interposing a tape and an adhesive that faces fabric sections to be joined between the seamer head and the seamer base, and generating pressure between the seamer head and the seamer base, wherein the topography forms a pressure gradient upon the tape, the pressure gradient having a higher pressure about a central region of the tape, and a lower pressure toward edges of the tape.

Yet another aspect of the present invention is to provide a method of forming a seam comprising providing a strap joint comprising at least two opposed fabric sections each having a facing surface a layer of adhesive disposed on the facing surfaces, and a tape disposed upon the adhesive layer to join the fabric sections, and applying a pressure gradient to the tape, wherein the pressure gradient is higher in a region about a center of the tape, and lower in regions extending away from the region about the center of the tape.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
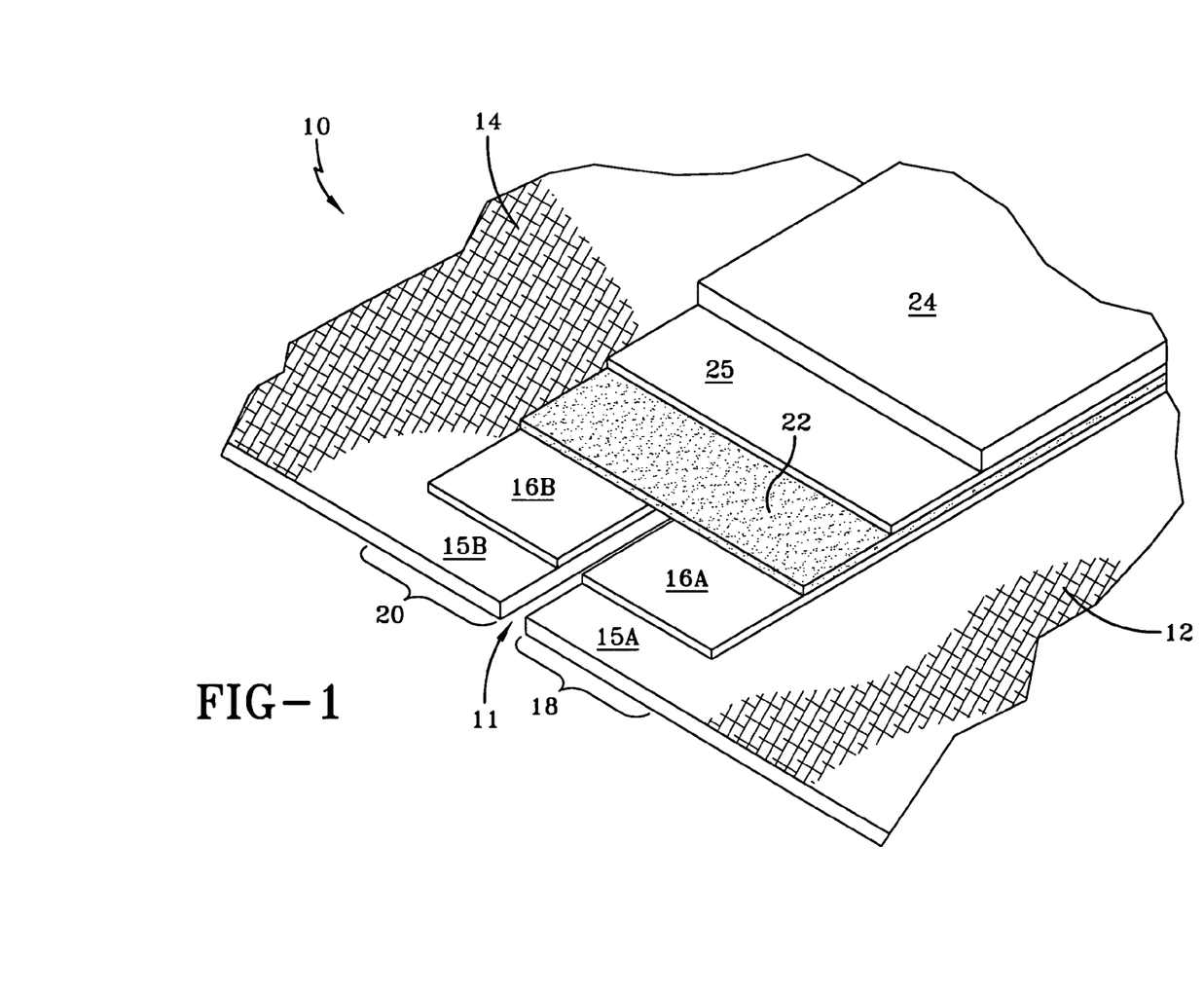
FIG. 1 is a perspective and partial cut-away view of a strap joint seam formed by a seaming system according to the concepts of the present invention.

To facilitate the understanding of the present invention discussed herein, a strap joint seam, generally referred to by the numeral 10, is shown in FIG. 1 of the drawings. The strap joint seam 10 according to the concepts of the present invention is used to join various sections of high-modulus, high-tenacity, low-elongation fabric together at a joint 11. Exemplary fabric, also referred to as a laminate material, are disclosed in U.S. Pat. No. 6,979,479; and in U.S. patent application Ser. No. 11/231,569 filed on Sep. 21, 2005, both of which are incorporated herein by reference. Specifically, the various sections of high-modulus, high-tenacity, low-elongation fabric are joined together in a manner to provide stiffness in a direction normal, or substantially normal (i.e. perpendicular) to the joint 11, and elasticity in the direction along the length of the joint 11. As such, the strap joint seam 10 is desirable to join various sections of high-modulus, high-tenacity fabric that may be used for various applications, such as to form an external skin for a high-altitude airship. As used herein, the term fabric may mean a laminate, a layer or layers of homogeneous material, or layers of similar or dissimilar materials. Additionally, the layer or layers of the fabric may contain woven or non-woven filaments that may be oriented in a single orientation or multiple orientations. And, although the seam 10 is used with fabrics associated with air ships, it will be appreciated that the seam and related methods for making the seam are applicable for use in any application which requires the joining of fabrics to one another.

With reference to FIG. 1, the strap joint seam 10 is shown in detail, and is formed by providing at least a first and a second opposed sections of fabric 12 and 14. In other words, each section of fabric has opposed edges that are positioned adjacent one another so that they abut or so that they are slightly spaced apart. In some instances, the edges may slightly overlap one another. Each section of fabric 12 and 14 has at least one tape facing surface 15A and 15B to receive various layers of primer and adhesive, to be discussed below. As used herein, the A suffix used with a structural component refers to components associated with the fabric 12, and likewise, the B suffix refers to components associated with the fabric 14. While the present invention discusses the formation of the seam using high-modulus, high-tenacity, low-elongation fabrics, such discussion should not be limiting, as other fabrics having a low-modulus, and/or a low-tenacity, and/or a high-elongation may be employed. Continuing, a first layer of primer 16A and 16B, such as isocyanate, is applied to the respective facing surfaces 15A and 15B of the fabric sections 12 and 14 to form respective primer sections 18 and 20. In a laminated manner, an adhesive layer 22 is disposed upon the primer sections 18 and 20 such that only about the minimum amount of adhesive needed to bond a tape 24 to the fabric sections 12 and 14 is applied. Another primer layer 25 may also be applied to the surface of the tape 24 that faces the adhesive layer 22 when the tape 24 is applied to the sections of the fabric 12 and 14, so as to facilitate bonding. Due to the nature of adhesives, unwanted stress variations are inherently produced within any bond. Therefore, by utilizing only the minimum amount of adhesive needed to sufficiently bond the tape 24 to the fabric sections 12 and 14, any potential stress variations are reduced. In some instances, it will be appreciated that the structural tape 24 may have a pre-applied adhesive 25 which is covered by a release liner that is removed prior to application of the tape to the primer sections 18 and 20. Although most any type of adhesive could be used, an exemplary adhesive used to create the adhesive layer 22 may comprise thermoplastic polyurethane (TPU) that is heat activated. Once the tape 24 is bonded to the fabric sections 12 and 14 in a process to be discussed, the seam 10 is complete. It should also be appreciated that the tape 24 may be formed from a tape fabric that is comprised of the same material as that of the fabric sections 12 and 14, or may be formed from another type of material. For instance, the tape 24 and fabric sections may be formed from a material having multiple plies comprising a laminated base layer and a bias layer. For example, the tape 24 or the fabric sections 12 and 14 may contain one or more layers of cloth. Such cloth layers may include a base structural cloth layer, and a bias layer that has a weave pattern that is oriented at a desired angle with respect to the weave pattern of the base cloth layer. In one embodiment, the weave pattern of the bias layer and the base layer may be oriented at an angle of about 45 degrees with respect to each other. It is also contemplated that the tape 24 and the fabric sections 12 and 14 may incorporate a film material in a laminated manner with the base layer and/or the bias layers previously discussed.

Figure 1A:
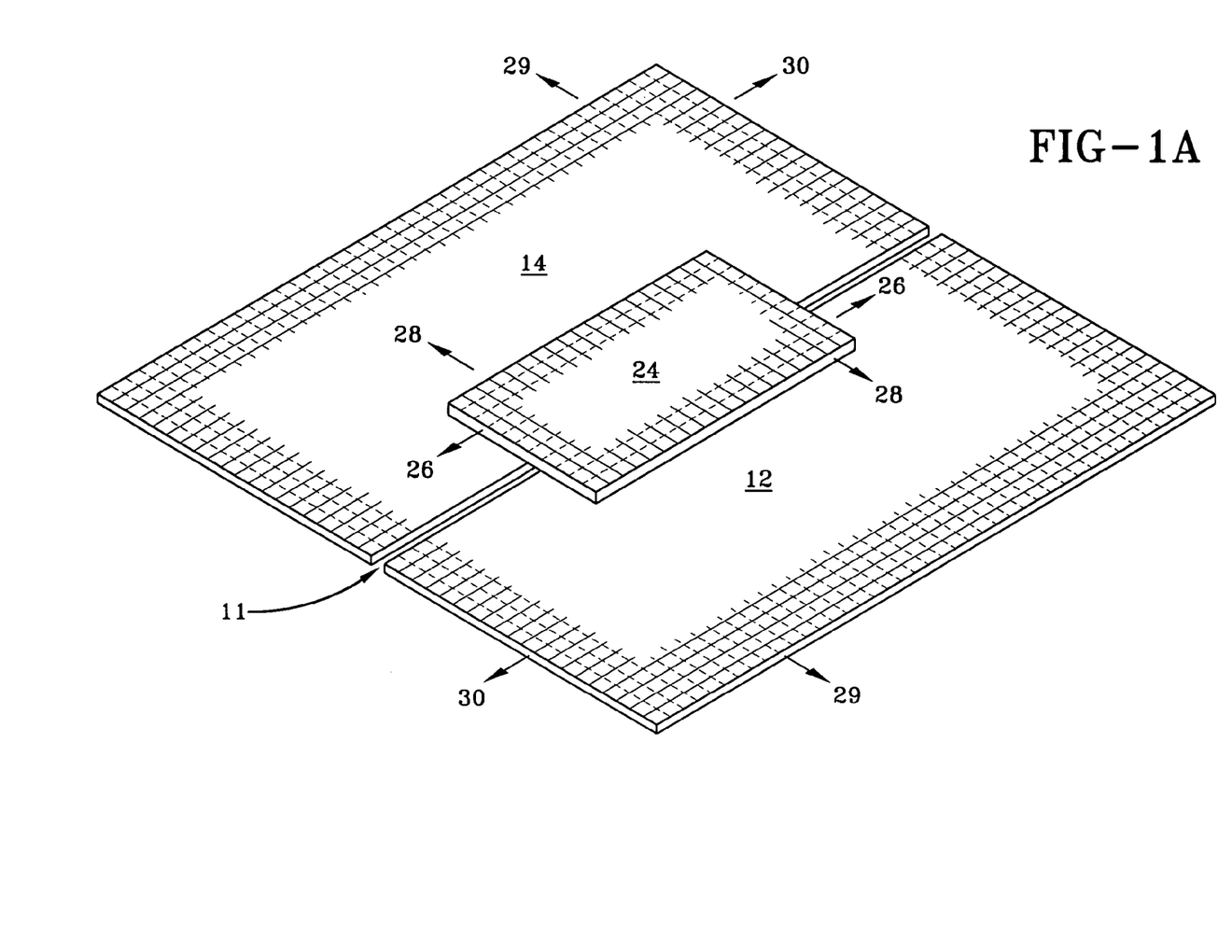
FIG. 1A is a perspective view of the relative orientation of warp and fill yarns of respective tape and fabric sections used to form the strap joint seam.

The tape 24 and the first and second fabric sections 12 and 14, which are shown more clearly in FIG. 1A, comprise a fabric having yarns oriented in various directions relative to one another. Specifically, the tape 24 includes yarns 26 in a warp direction, and yarns 28 in a fill direction, hereinafter referred to as warp yarns and fill yarns 26 and 28 respectively. The warp and fill yarns 26,28 are substantially perpendicular to each other, however it is not required, as the warp yarns 26 and the fill yarns 28 may have any other suitable angle or bias relative to each other. For the purposes of the following discussion of the tape 24, the warp yarns are oriented such that they are substantially parallel to the joint 11, when the tape 24 is applied to the seam 10. Whereas, the fill yarns 28 of the tape 24 are substantially perpendicular to the joint 11, when the tape 24 is applied to the sections 12 and 14. The fabric sections 12 and 14, also include yarns 29 in a warp direction and yarns 30 in a fill direction, hereinafter referred to as warp and fill yarns 29 and 30 respectively. The warp and fill yarns 29 and 30 are substantially perpendicular to each other, however it is not required, as the warp yarns 29 and the fill yarns 30 may have any other suitable angle or bias relative to each other. With respect to the fabric sections 12 and 14, the fill yarns are substantially parallel to the joint 11 of the seam 10, while the warp yarns are substantially perpendicular to the joint 11 of the seam 10. As such, the warp and fill yarns 26 and 28 of the tape 24 are oriented at about a ninety degree angle with respect to the warp and fill yarns 29 and 30 of the fabric sections 12 and 14. In other words, the warp yarns 26 of the tape are substantially perpendicular to the warp yarns 29 of the fabric sections 12 and 14, while the fill yarns 28 of the tape are substantially perpendicular to the fill yarns 30 of the fabric sections 12 and 14. However, it should be appreciated that the respective warp and fill yarns of the tape 24 and the fabric sections 12 and 14 may be oriented at any desired angle relative to each other. It should also be appreciated that when the tape 24 comprises tape fabric, as previously discussed, that the warp and fill yarns (not shown) comprising the tape fabric are in substantial alignment with the respective warp 29 and fill 30 yarns of the fabric sections 12 and 14 being joined.

When the tape 24 is applied to the fabric sections 12 and 14 in accordance with the present invention, it is applied such that the fill yarns 28 are substantially perpendicular with the joint 11 of the seam 10, and the warp yarns 26 are substantially parallel with the joint 11. More specifically, the tape 24 may be formed from a material that has a number of fill yarns (or yarn count in the fill direction) that are equal in number to the number of warp yarns (or yarn count in the warp direction) of the fabric sections 12 and 14. By matching yarn counts in the fill direction of the tape 24 and the yarn counts in the warp direction of the fabric sections 12 and 14, the resultant seam 10 is more efficient in distributing forces between the first and second sections of fabric 12 and 14, thus enhancing the lifetime or service life of the seam 10. Furthermore, it is also contemplated that the warp yarns 26 of the tape 24 may be formed from low strength, high elongation yarns, such as polyester, for example. Use of such elastic yarns allows any stress induced at the seam 10 to be distributed about the seam 10. Moreover, when the seam 10 is used in high-altitude airships, the use of elastic warp yarns in the tape 24 allows the seam 10 to accommodate the expansion and contraction of the hull of the airship during ascent and descent. Although the construction of the tape 24, as discussed above, provides several benefits, it is also contemplated that the tape 24 may be formed from a material that has a number of fill yarns that is about 10% higher than the number of warp yarns used in the fabric sections 12 and 14. Although any dimension may be used, it should be appreciated that the dimensions of the first and second primer sections 18 and 20, and the dimensions of the adhesive layer 22 are selected to accommodate the dimensions of the tape 24 so as to increase the strength of the bond between the tape 24 and the fabric sections 12 and 14. To complete the formation of the strap joint seam 10 in accordance with the concepts of the present invention various systems and methods are employed which are explained in the discussion that follows.

Figure 2:
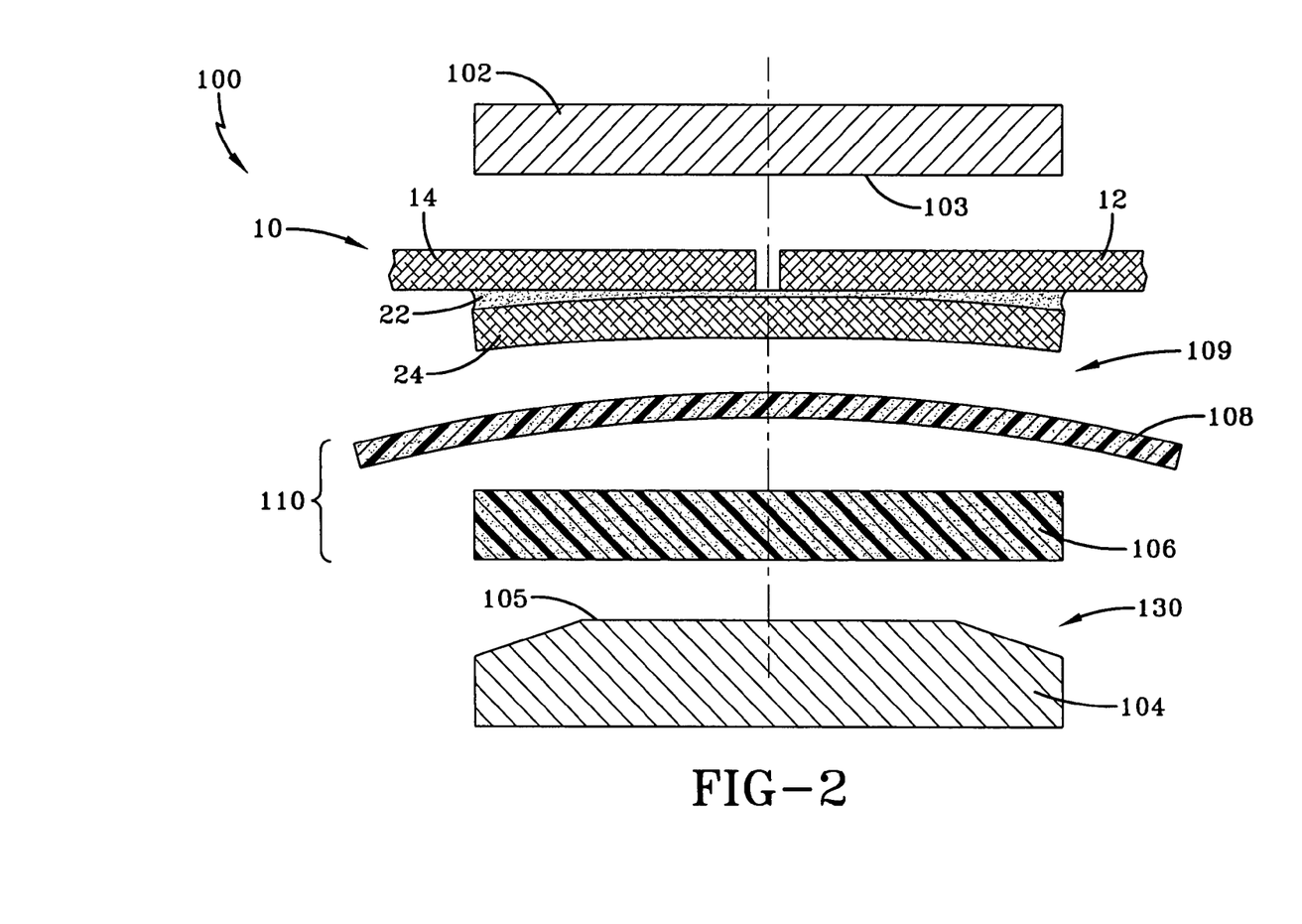
FIG. 2 is an elevational, schematic view of the seaming system used to form the strap joint seam shown in FIG. 1.

A seaming system according to the present invention is generally referred to by the numeral 100, shown in FIG. 2 of the drawings. The seaming system 100 comprises a seamer head 102, having a head surface 103, and a seamer base 104 having a generally convex base surface 105. The seamer head 102 and/or seamer base 104 may be heated so as to supply heat to the seam 10 in order to melt, or flow the adhesive of the adhesive layer 22. The surfaces 103,105 of the respective seamer head 102, and seamer base 104 are situated in an opposing manner relative to each other, and are configured to move relative to each other so as to apply heat and/or pressure to the seam 10 placed therebetween. Typically, the head 102 is moved with respect to the base 104. But other movements of the head and the base may be utilized. The movements of the head and/or base may be implemented with motors, hydraulic actuators, or in any manner known to a skilled artisan. The seamer base 104 may be formed from aluminum, or any other suitable material, and may be configured so that the base surface 105 includes various topographies, which will be discussed later, that impart a predetermined pressure gradient to the seam 10, when pressure is supplied by the seaming system 100.

Disposed upon the seamer base 104 is a first backing layer 106, and a second backing layer 108. The first backing layer 106 is configured so that its length and width are dimensioned to match the length and width dimensions of the base surface 105 of the seamer base 104. In other words, the material comprising the first backing layer 106 does not overhang, or otherwise extend beyond, the perimeter defined by the length and width dimensions of the base surface 105. By dimensioning the first backing layer 106 in the manner discussed, the formation of wrinkles within the seam 10 during the seaming process is reduced. As such, the adhesive bonds formed between the tape 24 and the fabric sections 12 and 14 are strengthened, and made resistant to de-lamination.

The second backing layer 108 is dimensioned so that it overhangs, or extends beyond, the perimeter defined by the length and width dimensions of both the base surface 105, and that of the first backing layer 106. For example, the second backing layer 108 may extend beyond the perimeter dimensions of the base surface 105 and the first backing layer 106 by about ½ inch. Of course, other larger overhang dimensions could be used. By dimensioning the second backing layer 108 in the manner discussed, it is ensured that a suitable amount of pressure and support are delivered to the periphery, or edges, of the seam 10 by the seaming system 100, so that uniform and complete bonding between the tape 24 and the fabric sections 12 and 14 occurs. It should also be appreciated that the first backing layer 106 may be formed from silicone foam rubber having a thickness of about 0.50 inches, while the second backing layer 108 may be formed from silicone rubber having a thickness of about 0.20 inches, however any other suitable material or thickness of material may be utilized for either backing layer 106 and 108. Moreover, it is contemplated that the second backing layer 108 may have a durometer hardness of around Shore A 40, but is not required for the operation of the seaming system 100. Together, the first and second backing layers 106 and 108 are referred to hereinafter as a programmer 110. In addition to the functions previously discussed, the programmer 110 is utilized to control or modulate the application of heat and pressure delivered by the seamer head 102 and/or seamer base 104. Thus, by adjusting the thickness, hardness, or other attributes of the first and second backing layers 106 and 108, the amount of heat and pressure delivered to the seam 10 can be controlled to a more precise degree thereby modifying the stress distributing properties of the seam 10. The seamer head 102 and the seamer base 104 are spaced apart from each other so as to form an opening 109 therebetween. The opening is sized to receive the programmer 110, and the components of the seam 10.

By applying heat along with a pressure gradient to the seam 10, the seaming system 100 forms seams 10 that have reduced stress concentrations when placed under a load. This selective use of heat, pressure, the programmer 110 and the configuration of the base surface 105, results in the formation of a section or thickness profile in the adhesive layer 22 of the seam 10 comprising various regions of varying thicknesses. The thickness profile in the cross-section of the seam 10, allows stress to be imparted to the seam 10 to be distributed, thus preventing the formation of stress concentrations in and around the region of the seam 10. It should also be appreciated that the application of heat and/or pressure also alters the cross-section of the tape 24 and fabric sections 12 and 14 by redistributing the adhesive layer that is used to bond the tape 24 and the fabric sections 12 and 14. As a result of the decrease in stress concentrations about the region of the seam 10, the longevity of the seam 10, and the first and second fabric sections 12 and 14 joined thereby, are enhanced.

Figure 3:
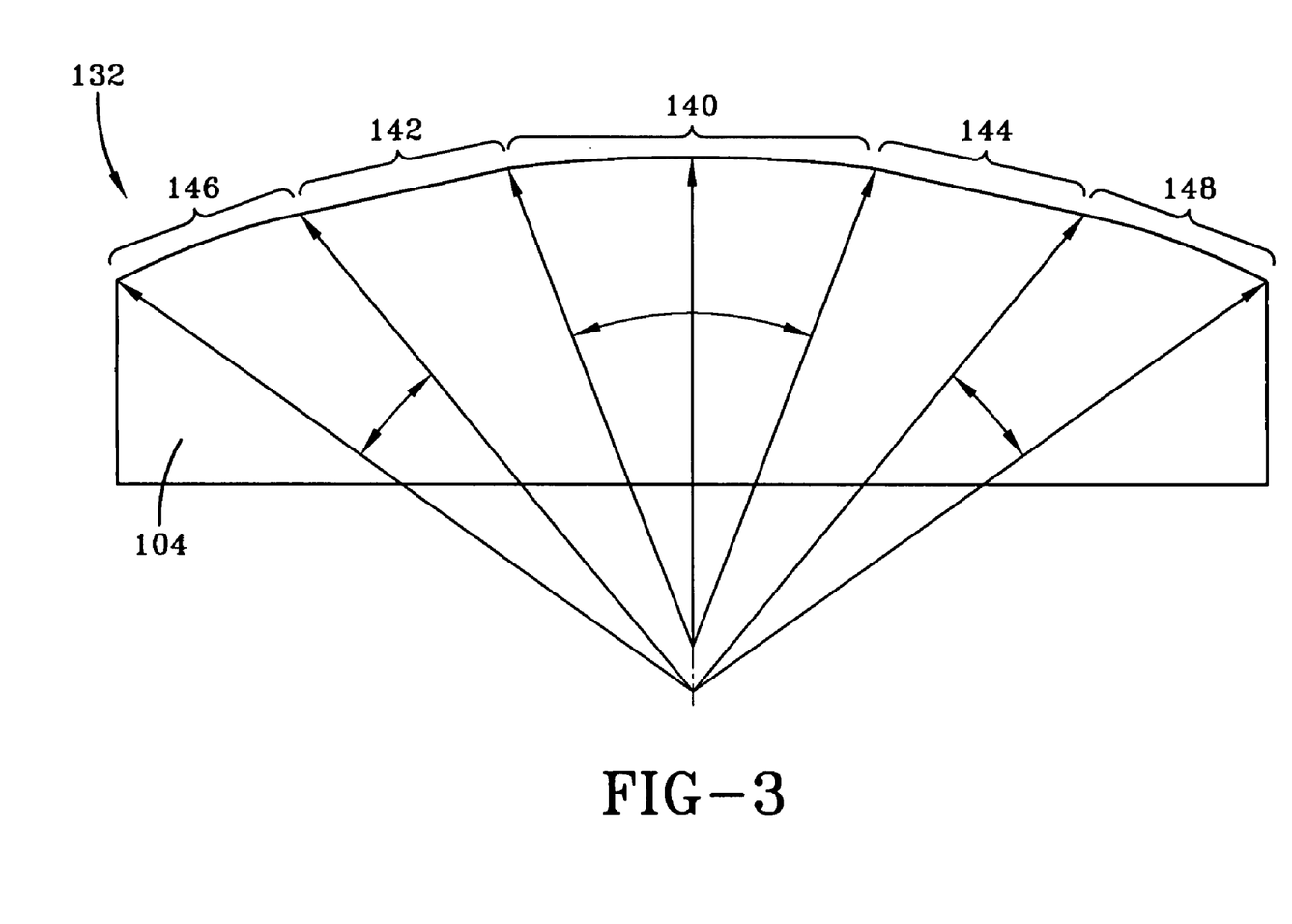
FIG. 3 is a cross-sectional view of a seamer base used in the seaming system that includes a preconfigured topography used to impart a pressure gradient upon the seam.

In order to form the seam 10 with a desired section profile, the base surface 105 of the seamer base 104 is configured to have a topography 130 that conforms in an inverse manner to the desired section profile to be imparted to the adhesive layer 22 of the seam 10. During operation of the seaming system 100, the structural components of the strap joint seam 10 are assembled and then interposed between the seamer head 102 and the second backing layer 108. The seamer base 104 and seamer head 102 are brought together to impart pressure and/or heat to the seam 10. Because of the topography 130, a pressure gradient is applied to the surface of the seam 10, which causes the adhesive layer 22 to be distributed according to the pressure gradient applied, thus creating a section profile in the seam 10. The topology 130 of the seamer base 104 as shown in FIG. 2, may be comprised of a combination various geometric or curvilinear shapes. However, in one embodiment, the seamer base 104 may have a topography 132, as shown in FIG. 3, which is comprised of various alternating linear and curvilinear sections. Specifically, the topography 132 may comprise a central curved section 140 that separates first and second linear sections 142 and 144. Together with the central curved section 140, the first and second linear sections 142 and 144 separate a first and a second curvilinear section 146 and 148. It will further be appreciated that the centers of the radius of curvatures for the curved sections 140, and 146 and 148, may be different as shown, or they could all be the same. And the curved sections may be formed by a discernable radius or may be formed from a complex radius of curvature. And the positioning of the curved sections with respect to the linear sections could be different and the number of sections may be adjusted to obtain a desired pressure gradient.

Figure 4:
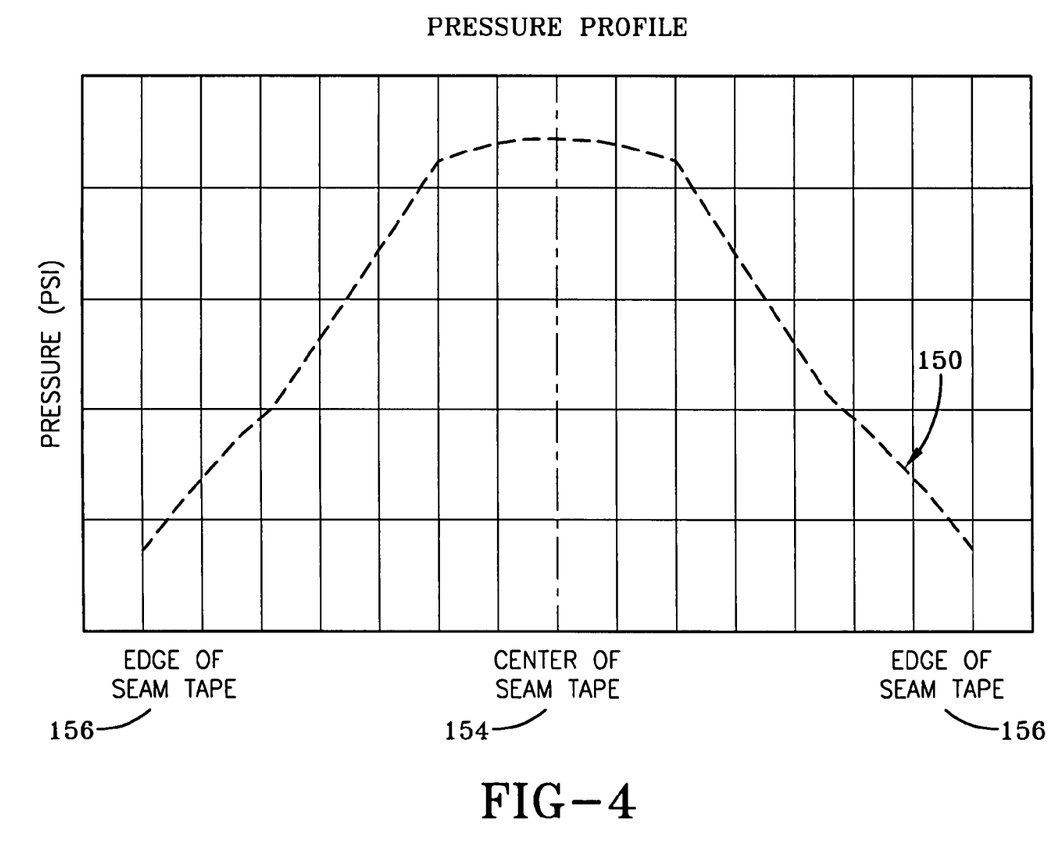
FIG. 4 is a graph of a pressure profile showing an exemplary pressure gradient delivered to the fabric sections and the tape of the strap joint seam during use of the seaming system.

The following discussion pertains to the use of the seaming system 100, which utilizes seamer head 104 having the topography 132 shown in FIG. 3. During operation of the seaming system 100, the components of the seam 10 are placed between the second backing layer 108, and the seamer head 102. In particular, the tape 24 portion of the seam 10 is placed adjacent the backing layer 108. Portions of the tape 24 may be clamped or otherwise held to maintain proper orientation thereof during the seaming process. Likewise, the fabric sections 12 and 14 may be positioned and held in place with respect to the tape 24 and the other adhesive and primer components of the seam. In any event, the seamer head 102 and seamer base 104 are then brought toward one another to apply pressure and/or heat to the seam 10, causing the first and second backing layers 106 and 108 to compress. The application of the heat causes the adhesive layer 22 to melt, or flow, resulting in the bonding of the tape 24 to the first and second fabric sections 12 and 14. Furthermore, the pressure applied from the seamer head 102 and seamer base 104, results in the topography 132 of the seamer base 104 creating a pressure gradient 150 being applied to the seam 10, which is shown in FIG. 4. It should be appreciated that when the seam 10 is positioned within the seaming system 100 that the tape 24 is aligned with the center of the topography 132. While this is not required for the successful operation of the present invention, it ensures that the pressure gradient is uniformly distributed across the tape 24 and periphery of the seam 10.

Figure 5:
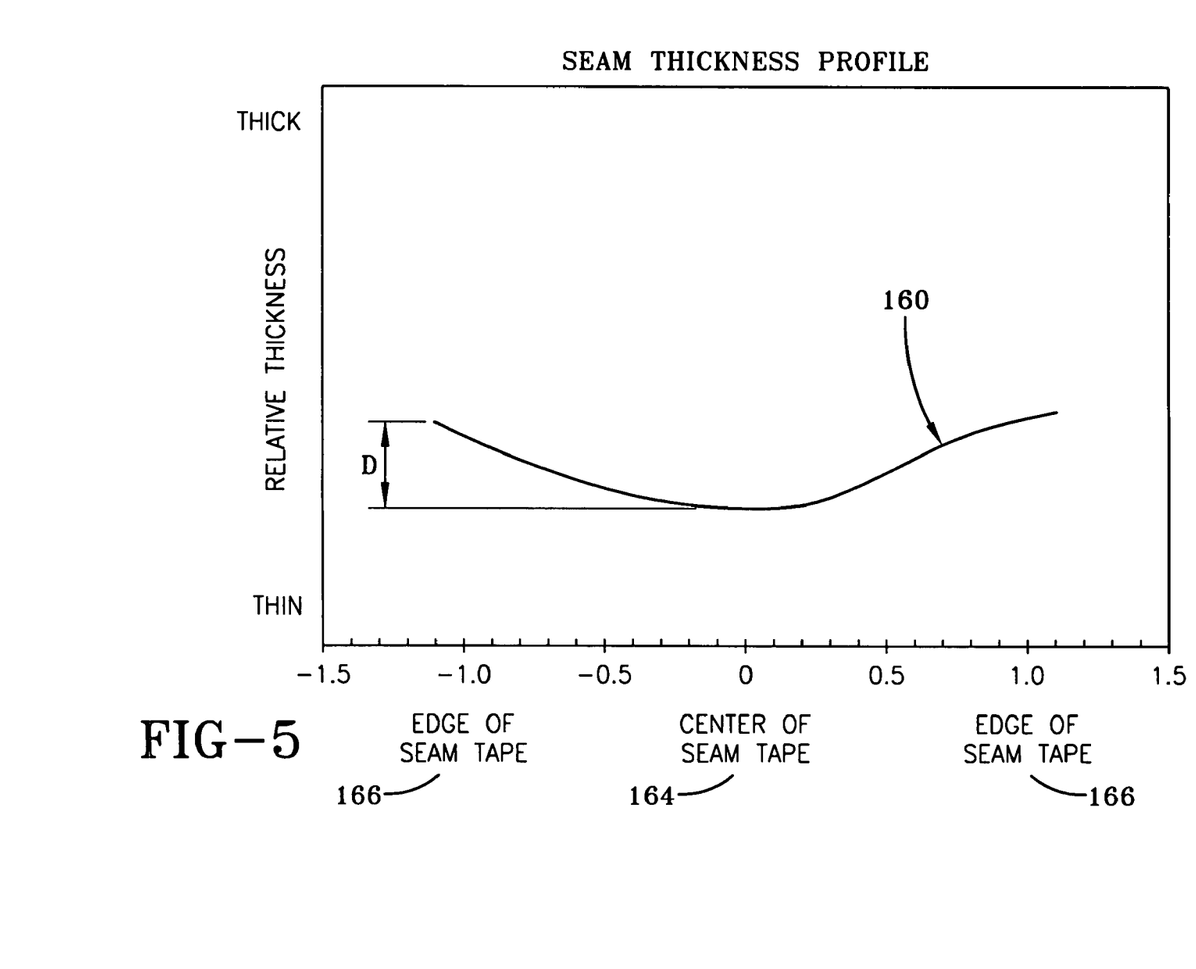
FIG. 5 is a graph of a thickness profile of a completed seam formed using the seaming system having the pressure profile shown in FIG. 4.

In detail, FIG. 4 depicts the pressure gradient 150 in PSI (pound-force per square inch) that is delivered to the seam 10 at a central portion 154 of the tape 24 and outwardly to the edges 156. As shown, the highest pressure is delivered to the central portion 154 of the seam tape 24, which corresponds to the central curved section 140 of the topography 132. The portions of the seam tape 24 extending outward from the central portion 154 are subjected to pressure that decreases in a tapered manner toward the edges 156 of the seam tape 24, which correspond to the curvilinear sections 146 and 148 and linear sections 142 and 144 of the topography 132. The application of the pressure gradient 150 along with heat from the seamer head 102 upon the seam 10 causes the adhesive layer 22 of the seam 10 to be distributed in accordance with the applied pressure gradient 150. Moreover, the viscosity of the melted or flowed adhesive 22 during the application of the heat and pressure results in the adhesive 22 flowing into or otherwise infiltrating the yarn matrix provided by the fabrics that comprise both the tape 24, and the fabric sections 12 and 14 in accordance with the applied pressure gradient discussed further below. That is, the heat and applied pressure of the seaming system 100 causes the tape 24, and first and second fabric sections 12 and 14 to be impregnated with the adhesive comprising the adhesive layer 22, whereby the degree of impregnation is directly related to the amount of pressure distributed by the pressure gradient. As a result of this process, the cross-section of the seam 10 takes on a non-uniform thickness profile as shown in FIG. 5. As used herein, non-uniform thickness refers to a thickness of the seam 10 after bonding, wherein the seam 10 (i.e. tape 24, and fabric sections 12 and 14) has different thickness dimensions across the width thereof. The thickness profile 160 depicts the relative thickness/thinness of the seam 10 after the pressure gradient 150 has been applied to the seam 10.

Figure 6:
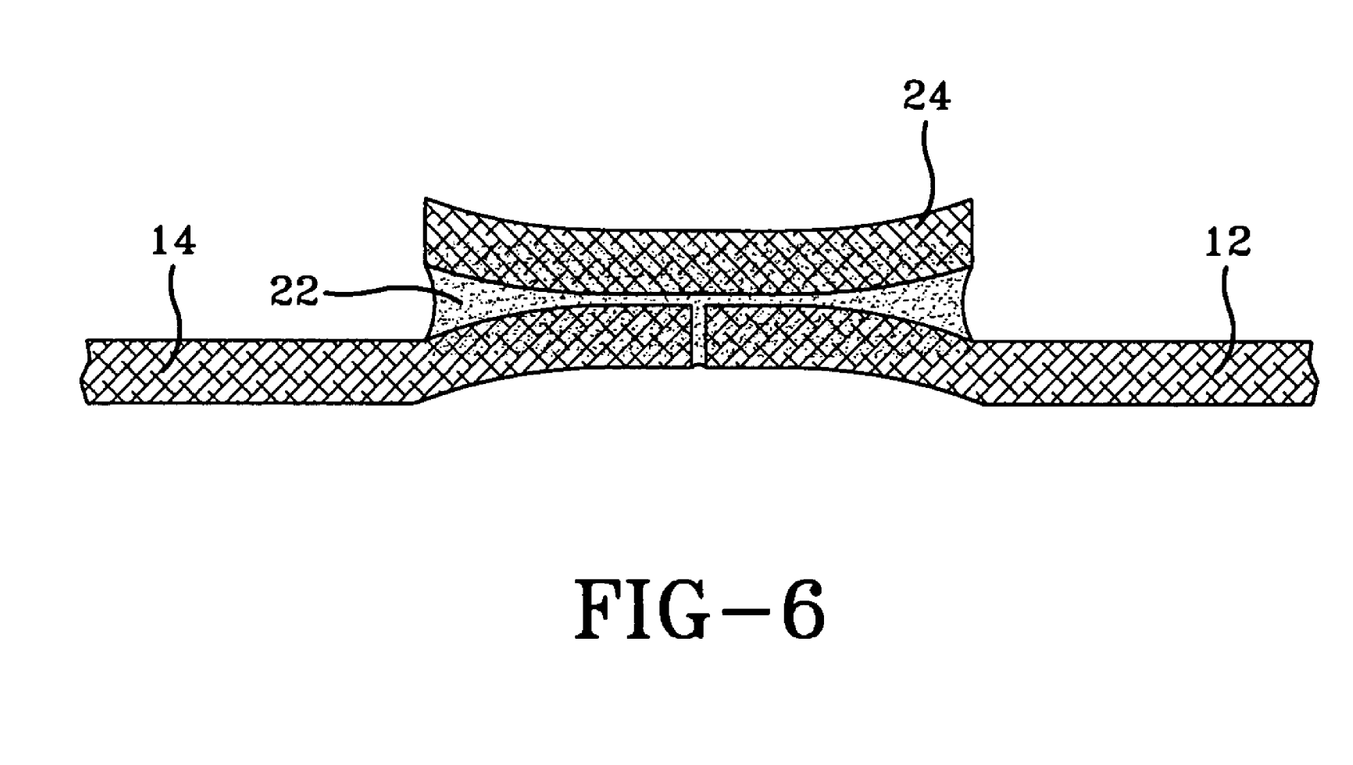
FIG. 6 is an elevational view of the seam interface depicting the distribution of the adhesive layer into the yarn matrix of the tape and first and second fabric layers after being processed by the seaming system.

FIGS. 5 and 6 together show that the thinnest portion of the thickness profile occurs at a center 164 position of the seam tape 24, where the adhesive layer 22 has been fully impregnated into the tape 24 and first and second fabric sections 12 and 24. In contrast, the thickest portions of the seam 10 are located at edge regions 166 that extend outward from the center 164, where a reduction in applied pressure of the pressure gradient causes a reduction in the amount of impregnation of the adhesive layer 22. Specifically, FIG. 6 shows the relative orientation of the adhesive layer 22 of the seam 10 after the adhesive layer 22 has been impregnated within the yarn matrix of the tape 24 and the first and second fabric sections 12 and 14 in accordance with the pressure profile. Returning to FIG. 5, the distance D shows the change in thickness between the center 164 of the tape 24, and the edges 166 of the tape 24. Thus, the thickness profile 160 shown in FIG. 5, together with the pressure gradient 150 shown in FIG. 4 illustrates that the regions of the seam 10 that are the thinnest, with the greatest impregnation of adhesive (center of seam 10), are subjected to the greatest pressure, and the regions that are the thickest with the least impregnation of adhesive (edges of seam 10) are subjected to the least pressure. Thus, the thickness profile 160 generally conforms in an inverse manner to the pressure gradient 150 applied to the seam 10. Thus, by adjusting the topography 130 of the seamer base 104, various non-uniform thickness profiles may be imparted to the seam 10 so as to modify the ability of the seam 10 to distribute applied stress and other forces.

Figure 7:
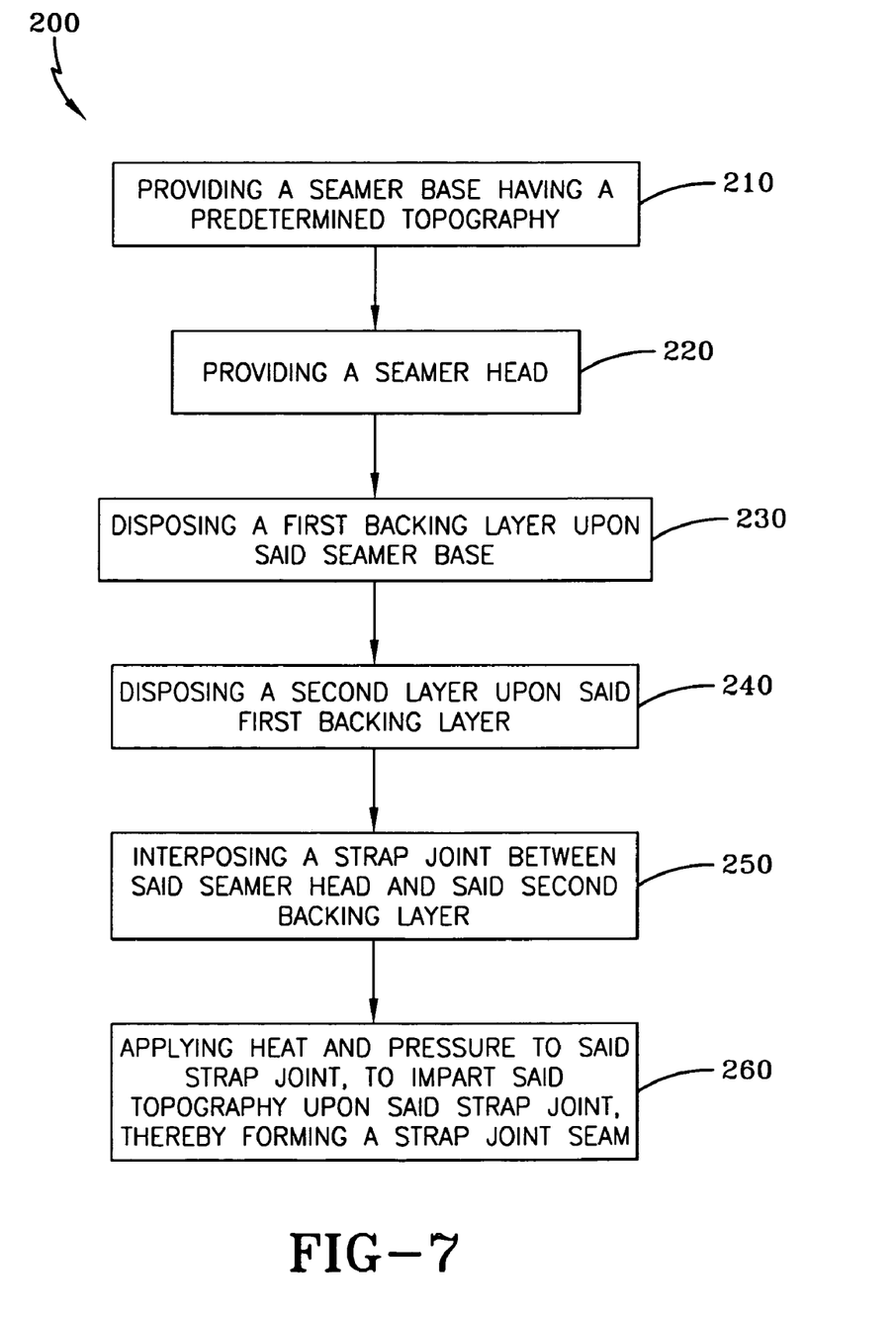
FIG. 7 is a flow chart depicting the operational steps performed by the seaming system to construct a seam according to the concepts of the present invention.

The operational steps performed by the seaming system 100 according to the concepts of the present invention are generally referred to by the numeral 200, as shown in FIG. 7 of the drawings. Furthermore, while the following discussion of the operational steps 200 relate to using the topography 132, such discussion is for illustrative purposes only, and should not be construed as limiting as other predetermined topographies 130 may be employed. Moreover, it should be appreciated that the steps described may be performed in a slightly different order, and still allow for the formation of the seam 10. Initially at steps 210 and 220 the seamer base 104, and the seamer head 102 are provided. As discussed above, the seamer base 104 may include various topographies, such as the topography 132 shown in FIG. 3. Next, at step 230, the first backing layer 106 is disposed upon the seamer base 104 so that it does not overhang the seamer base 104. Continuing to step 240, the second backing layer 108 is disposed over the first backing layer 106. Specifically, the second backing layer 108 is configured to overhang, or extend beyond, the perimeter of the first backing layer 106, and the seamer base 104. The arrangement of the first and second backing layers 106 and 108 prevents the seam 10 from developing wrinkles, while it is subjected to heat and/or pressure from the seaming system 100. Next, the components of the strap joint seam 10, as discussed with respect to FIG. 1, are interposed in the opening 109 between the seamer head 102 and the second backing layer 108, as indicated at step 250. Once the components are in place, the process 200 continues to step 260, where heat and/or pressure provided by the coaction of the seamer head 102 and the seamer base 104 are applied to the seam 10. The heat and/or pressure causes the predetermined topography 130 of the seamer base 104 to create the pressure gradient 150, which is imparted to the seam 10. The pressure gradient 150 causes the adhesive layer 22 of the seam 10 to be distributed in accordance with the pressure gradient 150, as previously discussed. As a result, the seam 10 attains the thickness profile 160 shown in FIG. 5, in which the cross-section of the seam 10 is thinner (smaller cross-section) at the region about the center of the tape 24, relative to the thicker regions (larger cross-section) of the edges of the tape 24 that extend away from the center portion of the tape 24. Although the processing described herein is in the context of bringing the base and head together to exert heat and/or pressure to the tape and fabric sections, it will be appreciated that roller-type mechanisms or the like could be used to automate the process and allow for long-length seams to be fabricated. In other words, the tape and fabric sections could be fed between rollers that have the same dimensional profiles/topography and the same programmer 110 configuration. And the appropriate amount of pressure and/or heat could be applied by the rollers to obtain a desired adhesive thickness profile.

It will, therefore, be appreciated that one advantage of one or more embodiments of the present invention is that a seam joining sections of high-modulus, high-tenacity fabrics can be formed, that distributes stresses imparted to it. Yet another advantage of a seam formed according to the concepts of the present invention is that it has reduced stress concentrations. An additional advantage of the seam formed according to the concepts of the present invention is that the seam has high strength perpendicular to the seam joint and minimized tensile stiffness parallel to the seam joint, to distribute stresses that are imparted to it. Still another advantage of the present invention is that a seaming system having a seamer base with a predetermined topography is used to create seams with a thickness profile configured to distribute stress.

Although the present invention has been described in considerable detail with reference to certain embodiments, other embodiments are possible. Therefore, the spirit and scope of the appended claims should not be limited to the description of the embodiments contained herein.

What is claimed is:

1. A seam comprising:
   at least two opposing fabric sections, each having a facing surface;
   an adhesive layer disposed upon each said facing surface; and
   a tape disposed upon said adhesive layer, so as to join said at least two opposing fabric sections, wherein said tape comprises a tape fabric having yarns in a warp direction and yarns in a fill direction, wherein said adhesive layer impregnates said at least two opposing fabric sections and said tape fabric, and said adhesive layer underlying said tape is configured to have a non-uniform predetermined thickness profile formed from the application of at least one of heat and pressure, and wherein said non-uniform thickness profile, after bonding of said fabric sections to said tape, has a thin portion at a center of said tape and a thick portion at at least one edge of said tape.

2. The seam according to claim 1, wherein said at least two opposing fabric sections include fabric yarns oriented in a warp direction and a fill direction.

3. The seam according to claim 2, wherein said fabric yarns in said at least two opposing fabric sections are substantially perpendicular to each other.

4. The seam according to claim 1, wherein said warp fabric yarns are substantially perpendicular to said warp tape yarns.

5. The seam according to claim 1, wherein said tape warp yarns comprise polyester.

6. The seam according to claim 1, wherein said tape has a yarn count in a fill direction that is substantially equal to a yarn count in a warp direction of each of the at least two opposing fabric sections.

7. The seam according to claim 1, wherein a yarn count in a fill direction of said tape is about 10% higher than a yarn count in a warp direction of said at least two opposing fabric sections respectively.

8. The seam according to claim 1, wherein said adhesive layer comprises thermoplastic polyurethane.

9. A seam comprising:
   at least two opposing fabric sections, each having a facing surface;
   an adhesive layer disposed upon each said facing surface; and
   a tape disposed upon said adhesive layer, so as to join said at least two opposing fabric sections, wherein said seam is configured to have a non-uniform predetermined thickness profile formed from the application of at least one of heat and pressure, wherein a yarn count in a fill direction of said tape is about 10% higher than a yarn count in a warp direction of said at least two opposing fabric sections respectively.

* * * * *